United States Patent
Wang

(10) Patent No.: US 7,201,098 B2
(45) Date of Patent: Apr. 10, 2007

(54) ELECTRIC AUTOMATIC-DRIP COFFEE MAKER WITH GRINDER

(76) Inventor: Dong-lei Wang, No. 1 Jinfeng Road, Tangjiawan Town, Xiangzhou District, Zhuhai City (CN)

( * ) Notice: Subject to any disclaimer, the term of this patent is extended or adjusted under 35 U.S.C. 154(b) by 406 days.

(21) Appl. No.: 10/863,402

(22) Filed: Jun. 8, 2004

(65) Prior Publication Data

US 2005/0120885 A1 Jun. 9, 2005

(30) Foreign Application Priority Data

Dec. 9, 2003 (CN) .................. 2003 2 0118955 U

(51) Int. Cl.
*A47J 31/42* (2006.01)
(52) U.S. Cl. .................. 99/286; 99/289 R; 99/290
(58) Field of Classification Search ................ 99/286, 99/287, 279, 275, 289 R, 290; 241/101.1, 241/101.2, 259.1
See application file for complete search history.

(56) References Cited

U.S. PATENT DOCUMENTS

| | | | | |
|---|---|---|---|---|
| 4,555,984 A | * | 12/1985 | Yamashita | 99/286 |
| 4,742,767 A | * | 5/1988 | Komatsu et al. | 99/280 |
| 4,913,037 A | * | 4/1990 | Newnan | 99/286 |
| 5,511,465 A | * | 4/1996 | Friedrich et al. | 99/286 |
| 6,827,002 B1 | * | 12/2004 | Lin | 99/286 |

* cited by examiner

*Primary Examiner*—Reginald L. Alexander
(74) *Attorney, Agent, or Firm*—Tim Tingkang Xia; Morris, Manning & Martin

(57) ABSTRACT

This invention discloses an electric automatic-drip coffee maker with grinder, including a casing, an automatic coffee grinding device, a coffee basket assembly, a carafe for collecting coffee, a water reservoir, a heater for heating the cold water inside the water reservoir, and a water supply tube for supplying hot water to said coffee basket assembly; wherein, said grinding device further includes a coffee grounds discharge passage with its outlet positioned right above said coffee basket assembly; a partition assembly is installed between said coffee grounds discharge passage and said coffee basket assembly, said partition assembly can be rotated relative to said coffee basket assembly around a vertical axis. The coffee maker of the present invention can be used to grind and brew coffee effectively, to reduce or eventually eliminate the need for displacing the filter basket, so as to be convenient for use.

4 Claims, 7 Drawing Sheets

ELECTRIC AUTOMATIC-DRIP COFFEE MAKER WITH GRINDER

TECHNICAL FIELD

This invention relates to an electric automatic-drip coffee maker with grinder.

BACKGROUND OF THE INVENTION

Currently, the electric automatic-drip coffee maker with grinder is quite popular for its convenience and practicability in use. However, how to reduce the time interval during which the coffee grounds are exposed in air, how to reduce the heat consumed in coffee making, and how to completely prevent the water steam from entering the grinder through the coffee grounds discharge passage are always big concerns for people. U.S. Pat. No. 5,615,601 disclosed a coffee machine with a coffee grinder defining a grinding position there under. Said grinding position is horizontally spaced from the brewing position. There is also provided a filter carrier adapted to receive a filter basket, and a displacing mechanism for supporting the filter carrier and for moving the filter carrier into the grinding position or into the brewing position. In use, since the filter basket is required to be displaced frequently, the lifetime of the whole coffee machine is affected.

SUMMARY OF THE INVENTION

The main object of the present invention is to provide an electric automatic-drip coffee maker with grinder, which can be used to grind and brew coffee effectively, to reduce or eventually eliminate the need for displacing the filter basket, so as to be convenient for use.

The aim of the invention is achieved by following technical scheme:

An electric automatic-drip coffee maker with grinder, including a casing, an automatic coffee grinding device, a coffee basket assembly, a carafe for collecting coffee, a water reservoir, a heater for heating the cold water inside the water reservoir, and a water supply tube for supplying hot water to said coffee basket assembly; wherein, said grinding device further includes a coffee grounds discharge passage with its outlet positioned right above said coffee basket assembly; a partition assembly is installed between said coffee grounds discharge passage and said coffee basket assembly, said partition assembly can be rotated relative to said coffee basket assembly around a vertical axis.

Said partition assembly is constructed by a partition cover and a partition liner with a cavity in between. It forms a heat-resistant barrier above the filter basket when the coffee maker is in its working status. With the help of the partition assembly, the heat loss of the water steam can be reduced. Besides, since the temperature of the outer surface of the partition cover is near to room temperature, scald can be avoided when people touch the partition cover.

The outlet of said water supply tube is in the form of a spray nozzle located within said partition assembly and can be rotated along with said partition assembly.

When the rotatable partition assembly is rotated to its open position, the spray nozzle within said partition assembly left simultaneously from the right above position of said filter basket. Then, the outlet of the coffee grounds discharge passage is opened, the grinding device starts to work, the coffee grounds fall directly into the filter basket from said opened outlet. After coffee grinding, the rotatable partition assembly is returned to the right above position of the filter basket. The outlet of the coffee grounds discharge passage is then closed, and coffee brewing is started. The rotatable partition assembly forms a barrier between said filter assembly and said coffee grounds discharge passage, so as to prevent the water steam inside the filter basket from entering the coffee grounds discharge passage and the grinding device.

Said partition assembly is equipped with a temperature sensing and locking device. Users cannot rotate the partition cover to its open position unless the temperature detected by the temperature sensor is below a predetermined value. After working, both of the rotatable partition assembly and the filter basket are in the close position. Said temperature sensing and locking device is helpful for preventing accidental events.

A spring-loaded self-locking mechanism is installed respectively at the full-open position and close position of the rotatable partition assembly. When it is rotated to its full-open position, the rotatable partition assembly is self-locked. It cannot return to the close position under the effect of the spring unless it is released electrically or manually. Similarly, when it is rotated to its close position, the rotatable partition assembly is also self-locked. It cannot return to the open position under the effect of the spring unless it is released electrically or manually. Thus, after coffee is well prepared with the coffee maker, when the users open the filter basket assembly, the movable partition cover will not be actuated by accident.

Said filter basket assembly is located right under the coffee grounds discharge passage of the grinding device. It is rotatably connected or fixed with said casing in the similar manner like a conventional automatic-drip coffee maker.

Said rotatable partition assembly may be coupled integrally to the grinding device with coffee grounds passage, so that it can be rotated or upturned together with the grinding device. With this structure adopted, it is convenient to take out the filter from the fixed filter basket assembly by moving above-mentioned coupling integrity.

Alternatively, said rotatable partition assembly and the grinding device with coffee grounds passage may be rotatable separately, and the filter basket assembly is fixed to the casing. The coffee residue in the filter basket of the fixed filter basket assembly can be taken out by rotating the grinding device with coffee grounds passage.

With the coordination of the grinding device, the rotatable partition assembly and the filter basket assembly, the coffee grounds fall directly into the filter basket accurately, and be brewed, so that the time interval during which the coffee grounds are exposed in the air is reduced. The rotatable partition assembly is heat-resistant, so that the heat loss during coffee making can be reduced, and water steam is prevented from entering the grinding device through the coffee grounds discharge passage.

According to the present invention, the filter of the filter basket assembly can be taken out by moving (rotating or upturning) the movable component at the upper part of the casing, without horizontally displacing the filter basket assembly.

DETAILED DESCRIPTION OF THE PREFERRED EMBODIMENTS

Figure 1:
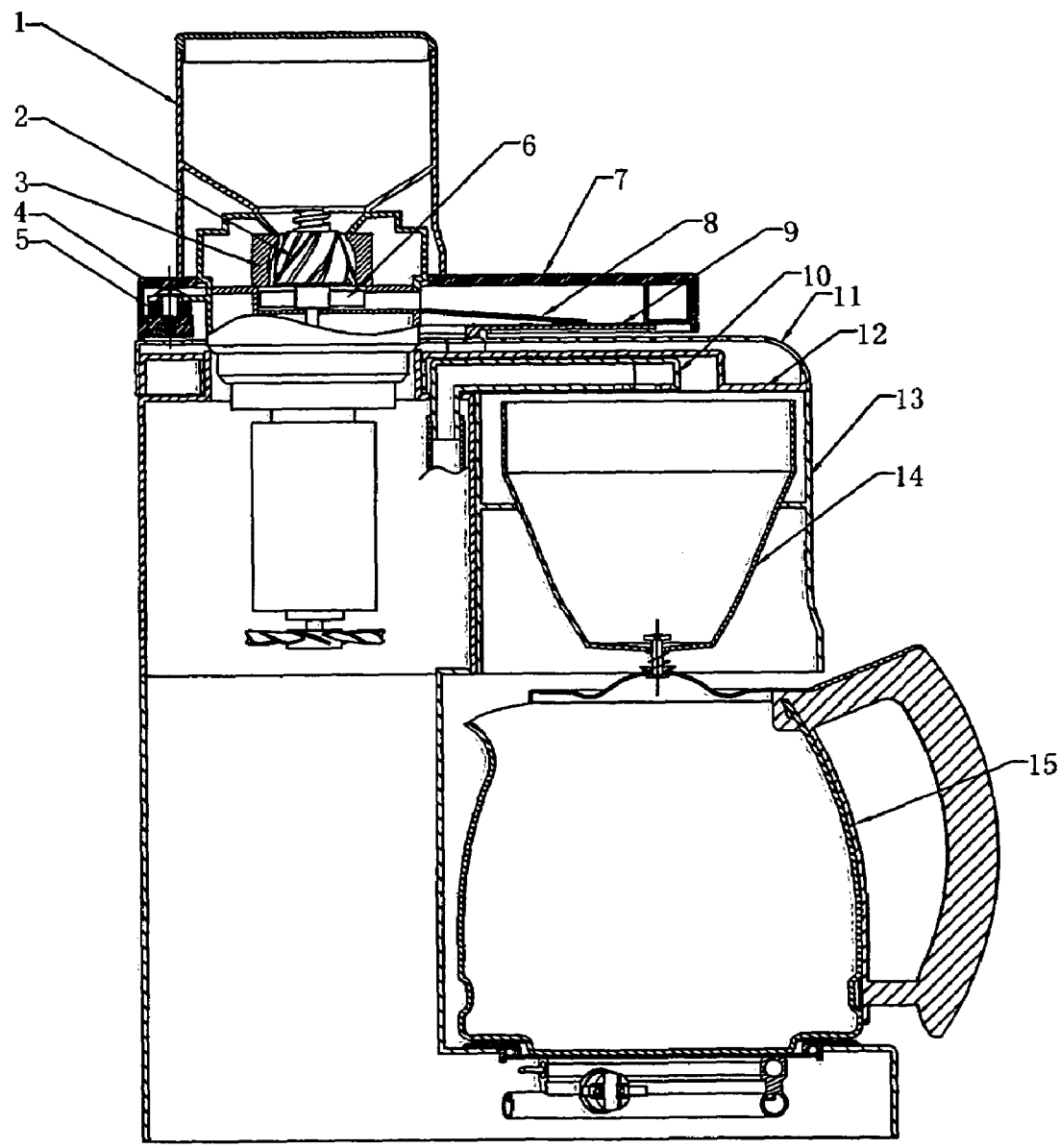
FIG. 1 is a schematic sectional view of the coffee maker according to the present invention.

As shown in FIG. 1, an electric automatic-drip coffee maker with grinder includes a casing, an automatic coffee grinding device, a coffee basket assembly, a carafe for collecting coffee, a water reservoir, a heater for heating the cold water inside the water reservoir, and a water supply tube for supplying hot water to said coffee basket assembly.

Said grinding device includes a coffee bean box 1, at the bottom part of which are provided a grinding mechanism. Said grinding mechanism is comprised of a grinding rotor 2 and a grinding stator 3, by which the coffee beans entering the coffee bean box 1 are ground. Said grinding device is secured to said casing by screw 4. A soft rubber damper 5 is installed between said grinding device and said casing to reduce the shock when said grinding device is working.

After the coffee beans are ground, the coffee grounds are pushed by a discharge wheel 6 into the coffee grounds discharge passage 8. Said coffee grounds discharge passage 8 has a discharge passage outlet at its front end, an upper cover 7, and a blocking plate 9 for blocking said discharge passage outlet. Said blocking plate 9 may be moved back and forth along the slide grooves at both sides of the discharge passage outlet, so as to close or open the discharge passage outlet.

Between said coffee grounds discharge passage and said coffee basket assembly is located the rotatable partition assembly.

Said partition assembly is constructed by a partition cover 11 and a partition liner 12 with a cavity in between. The outlet of said water supply tube is in the form of a spray nozzle 10 located within said partition assembly and can be rotated along with said partition assembly.

When the rotatable partition assembly is rotated to its open position, the spray nozzle within said partition assembly left simultaneously from the right above position of said filter basket. Then, the outlet of the coffee grounds discharge passage is opened, the grinding device starts to work, the coffee grounds fall directly into the filter basket from said opened outlet. After coffee grinding, the rotatable partition assembly is returned to the right above position of the filter basket. The outlet of the coffee grounds discharge passage is then closed, and coffee brewing is started. The rotatable partition assembly forms a barrier between said filter basket assembly and said coffee grounds discharge passage, so as to prevent the water steam inside the filter basket from entering the coffee grounds discharge passage and the grinding device.

Said partition assembly is equipped with a temperature sensing and locking device. Users cannot rotate the partition cover to its open position unless the temperature detected by the temperature sensor is below a predetermined value. After working, both of the rotatable partition assembly and the filter basket are in the close position. Said temperature sensing and locking device is helpful for preventing accidental events. For example, after the coffee is well prepared with the coffee maker, if the users accidentally open the movable partition assembly, the passage between the filter basket and the grinding device will be open through, thus, the residue water steam inside the filter basket will enter the grinding device, and cause deposit and block in the coffee grounds discharge passage. Furthermore, the hot residue water steam may come out and cause accidental scald to people. While with said temperature sensing and locking device installed, such accidents can be avoided.

A spring-loaded self-locking mechanism is installed respectively at the full-open position and close position of the rotatable partition assembly. When it is rotated to its full-open position, the rotatable partition assembly is self-locked. It cannot return to the close position under the effect of the spring unless it is released electrically or manually. Similarly, when it is rotated to its close position, the rotatable partition assembly is also self-locked. It cannot return to the open position under the effect of the spring unless it is released electrically or manually. Thus, after coffee is well prepared with the coffee maker, when the users open the filter basket assembly, the movable partition cover will not be actuated by accident.

Said filter basket assembly is constructed by a filter basket carrier 13 and a filter basket 14. It is located right under the coffee grounds discharge passage of the grinding device. It is rotatably connected or fixed with said casing in the similar manner like a conventional automatic-drip coffee maker. If it is rotatably connected, it will be convenient for taking out of the filter or discharging the coffee residue.

Said carafe 15 is used for collecting the coffee well brewed.

Figure 2:
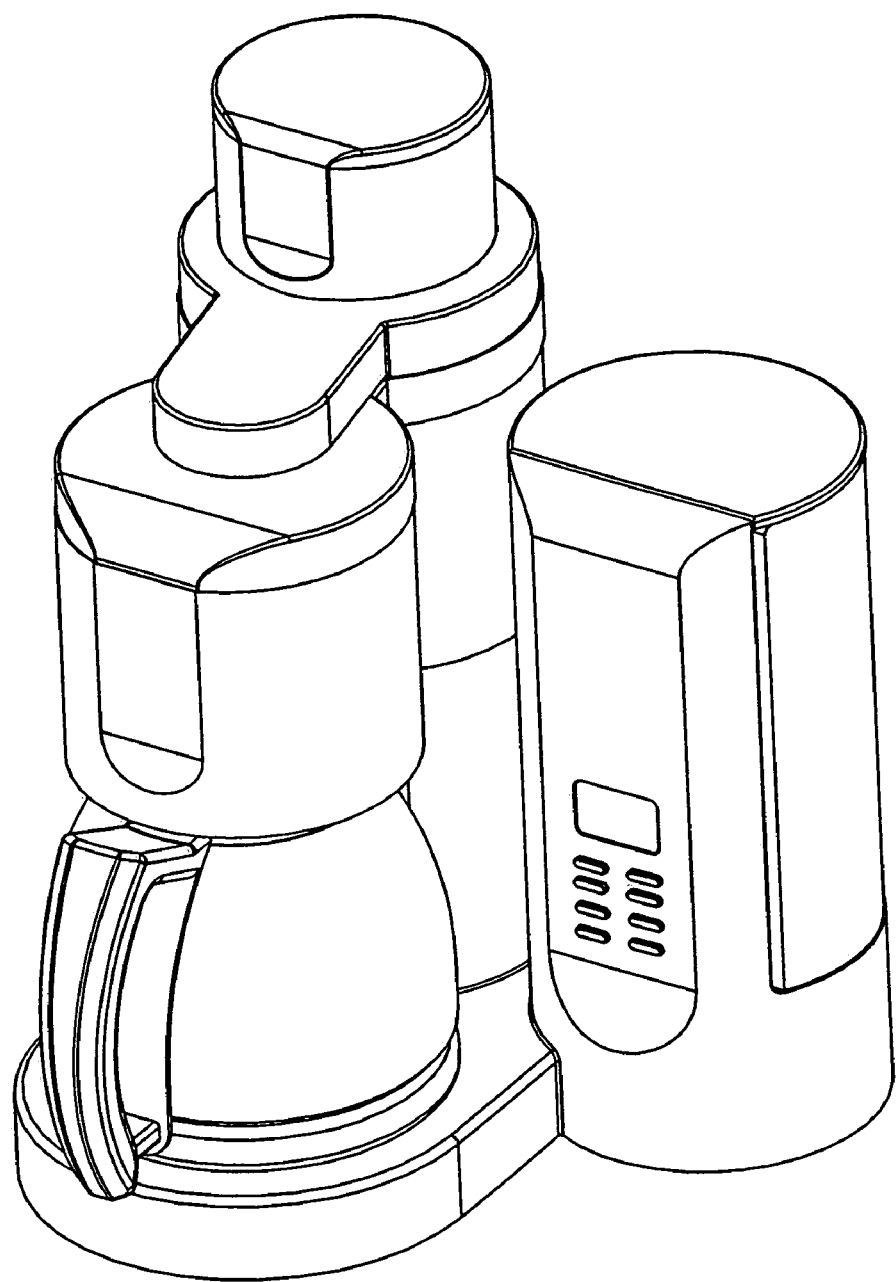
FIG. 2 is a schematic perspective view showing the outline of the coffee maker when both of the partition assembly and the filter basket assembly are in their close position.

As shown in FIG. 2, when the partition assembly and the filter basket assembly are both in their close position, water can be steamed normally. The rotatable partition assembly forms a barrier between the coffee grounds discharge passage and the filter basket assembly, so as to prevent the water steam from entering the coffee grounds discharge passage and the grinding device.

Figure 3:
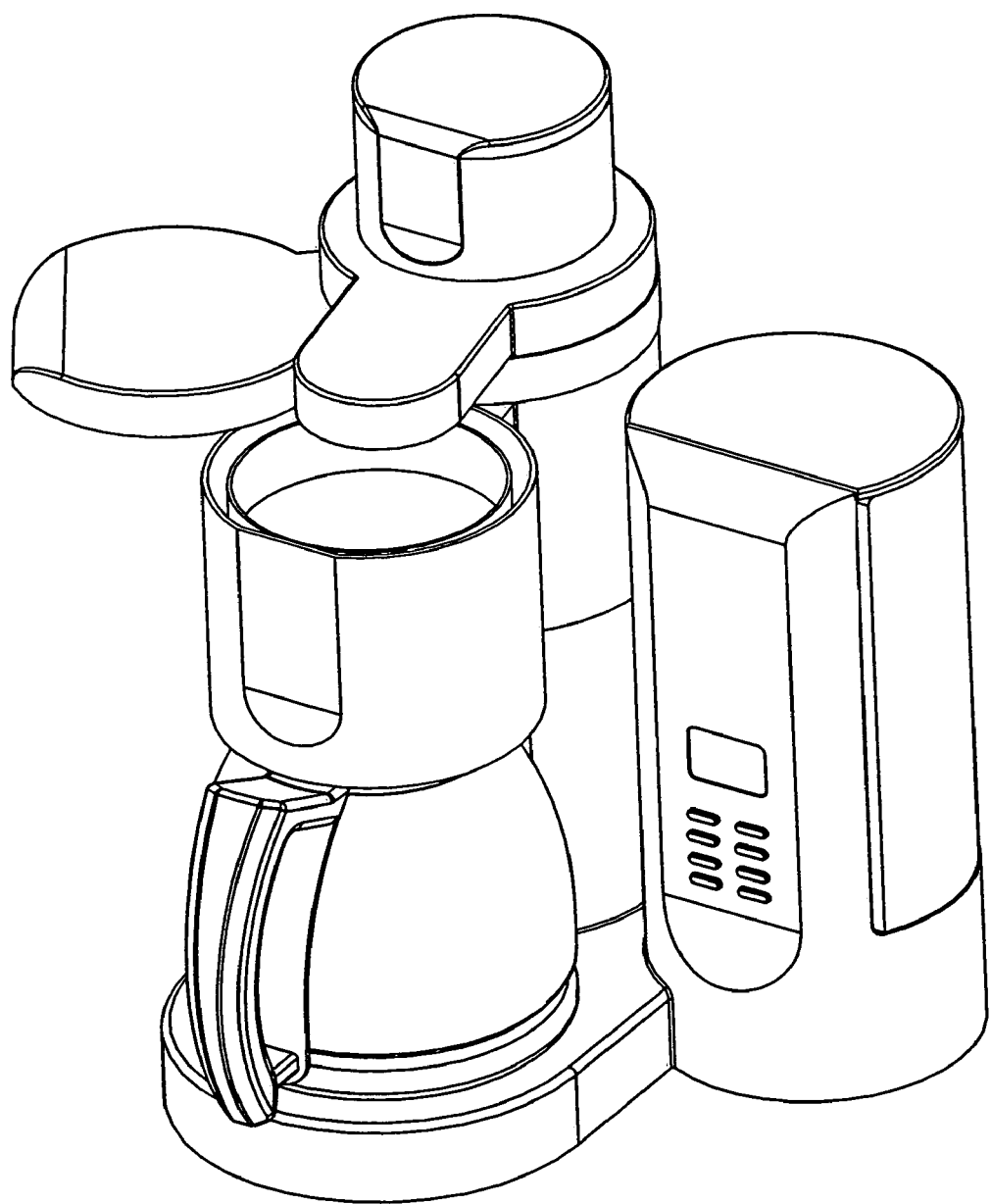
FIG. 3 is a schematic perspective view showing the outline of the coffee maker when the partition assembly is rotated to its open position and the filter basket assembly is in its close position.

As shown in FIG. 3, the partition assembly is in its open position and the filter basket assembly is in its close position. Then, the outlet of the coffee discharge passage is opened, and the coffee grounds will fall directly into the filter basket.

Figure 4A:
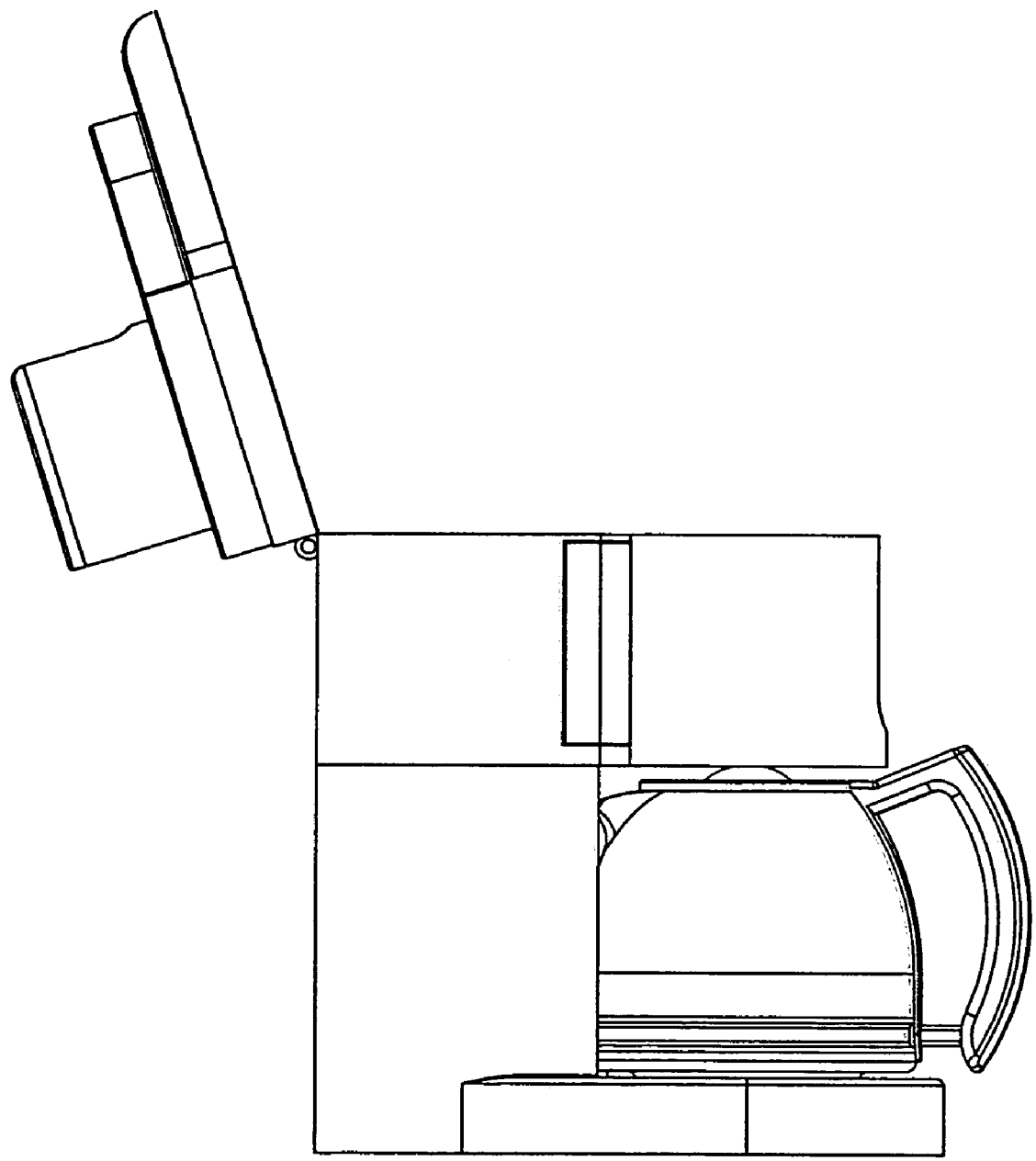
FIG. 4(a) is a schematic perspective view showing the outline of the coffee maker when the grinding device coupled with the partition assembly is upturned, and the filter basket assembly is in its close position.
Figure 4B:
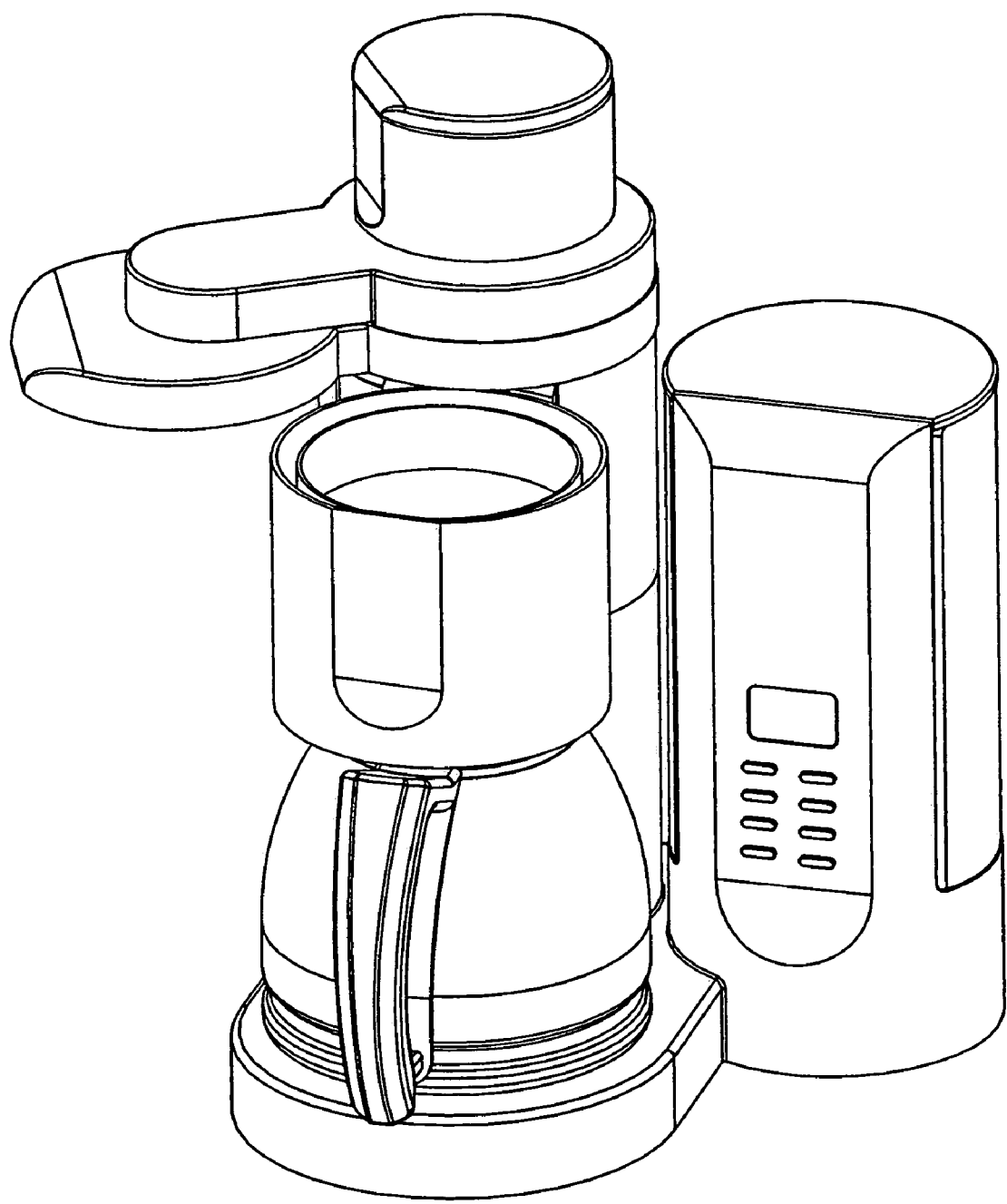
FIG. 4(b) is a schematic perspective view showing the outline of the coffee maker when the grinding device coupled with the partition assembly is rotated to its open position, and the filter basket assembly is in its close position.

As shown in FIGS. 4(a) and 4(b), the grinding device is coupled with the partition assembly, and the filter basket assembly is fixed. The users can take out the filter basket from the filter basket carrier by upturning or rotating said coupling integrity.

Figure 5:
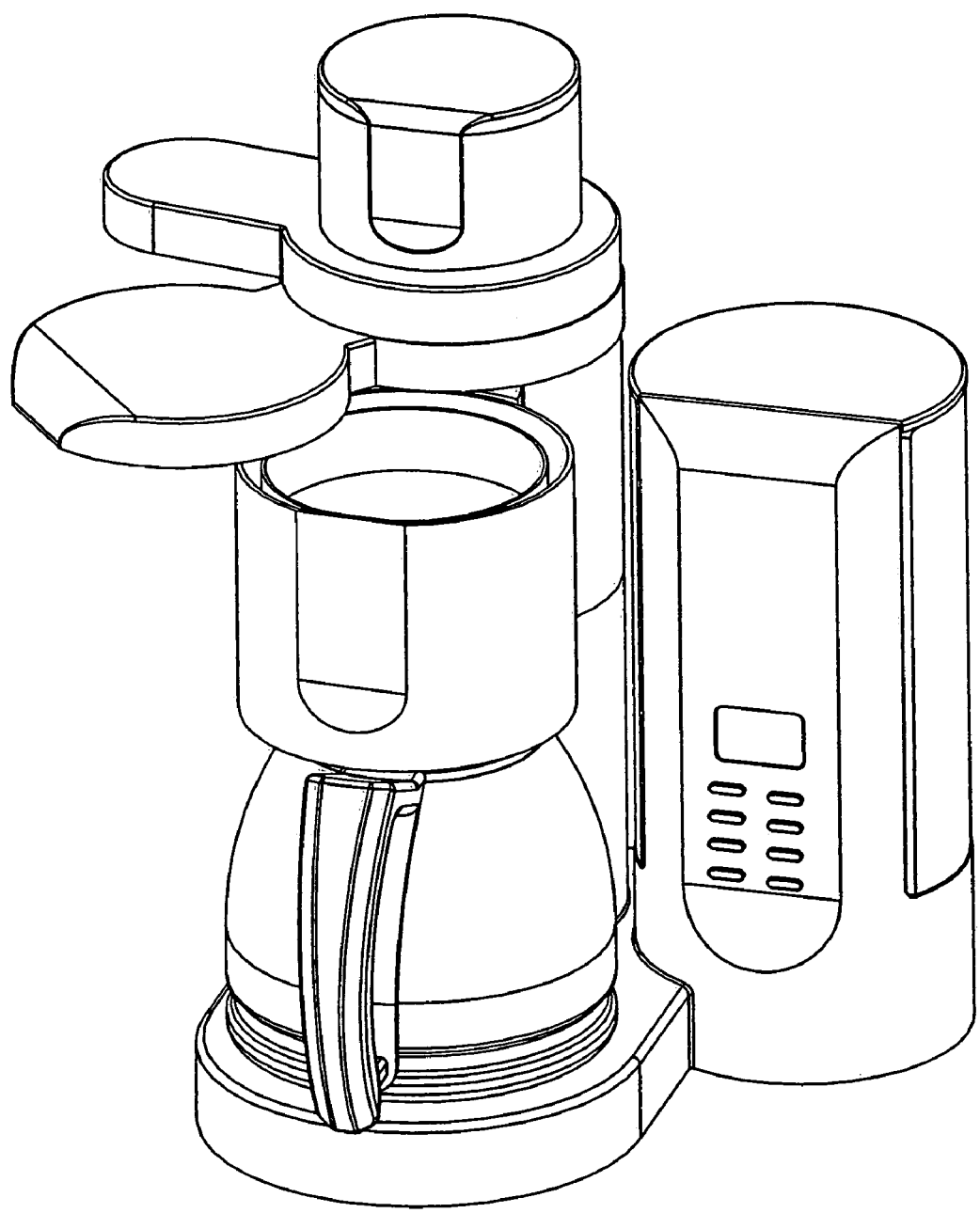
FIG. 5 is a schematic perspective view showing the outline of the coffee maker when the grinding device and the partition assembly are rotated separately to their open position, and the filter basket assembly is in its close position.

Alternatively, as shown in FIG. 5, the grinding device and the partition assembly may be rotated separately, while the filter basket assembly is fixed to the casing. The coffee residue in the fixed filter basket assembly can be taken out by rotating the grinding device with the coffee grounds discharge passage.

Figure 6:
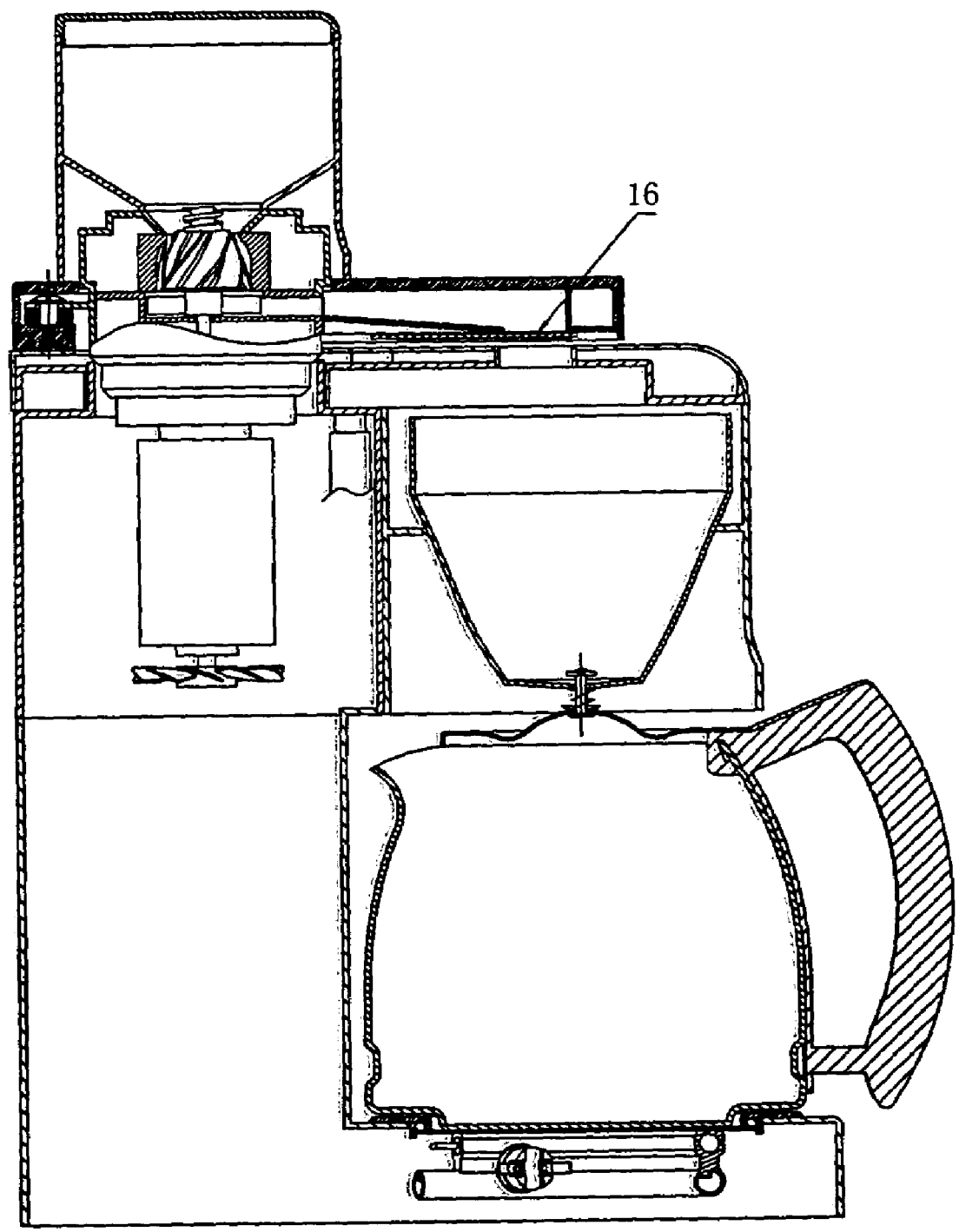
FIG. 6 is a schematic sectional view showing the coffee maker of the present invention with an automatic open-close control mechanism installed between the partition assembly and the coffee grounds discharge passage.

As shown in FIG. 6, instead of a blocking plate 9, an automatic open-close control mechanism 16 is installed between the rotatable partition assembly and the coffee grounds discharge passage for controlling the open and close of the outlet of the coffee grounds discharge passage. When coffee grounds are to be filled, the discharge passage outlet is opened, while when coffee is to be brewed, the discharge passage outlet is closed. The automatic open-close control mechanism 16 can be used to prevent the water steam inside the filter basket from entering the coffee grounds discharge passage and the grinding device.

What is claimed is:

1. An electric automatic-drip coffee maker with grinder, including a casing, an automatic coffee grinding device, a coffee basket assembly, a carafe for collecting coffee, a water reservoir, a heater for heating the cold water inside the water reservoir, and a water supply tube for supplying hot water to said coffee basket assembly; wherein, said grinding device further includes a coffee grounds discharge passage with its outlet positioned right above said coffee basket assembly; a rotatable partition assembly is installed between said coffee grounds discharge passage and said coffee basket assembly, and said rotatable partition assembly is coupled integrally to the grinding device with coffee grounds passage, so that it can be rotated or upturned together with the grinding device.

2. A coffee maker according to claim 1, wherein said partition assembly is constructed by a partition cover and a partition liner with a cavity in between.

3. A coffee maker according to claim 1, wherein the outlet of said water supply tube is in the form of a spray nozzle located within said rotatable partition assembly and can be rotated along with said rotatable partition assembly.

4. A coffee maker according to claim 1, wherein an automatic open-close control mechanism is installed between the rotatable partition assembly and the coffee grounds discharge passage for controlling the open and close of the outlet of the coffee grounds discharge passage.

* * * * *